(12) United States Patent
Eidelson et al.

(10) Patent No.: US 9,866,505 B2
(45) Date of Patent: *Jan. 9, 2018

(54) CONFIGURING PRESENCE AND NOTIFICATIONS IN PERSISTENT CONVERSATIONS

(71) Applicant: Google Inc., Mountain View, CA (US)

(72) Inventors: Benjamin David Eidelson, Palo Alto, CA (US); Ujjwal Singh, Palo Alto, CA (US); Heradon Douglas, Los Gatos, CA (US); Eric Barndoller, Mountain View, CA (US)

(73) Assignee: Google Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/349,642

(22) Filed: Nov. 11, 2016

(65) Prior Publication Data

US 2017/0085505 A1    Mar. 23, 2017

Related U.S. Application Data

(63) Continuation of application No. 13/894,408, filed on May 14, 2013, now Pat. No. 9,515,969.

(51) Int. Cl.
*G06F 15/16* (2006.01)
*H04L 12/58* (2006.01)

(52) U.S. Cl.
CPC ............ *H04L 51/043* (2013.01); *H04L 51/24* (2013.01); *H04L 51/16* (2013.01)

(58) Field of Classification Search
None
See application file for complete search history.

(56) References Cited

U.S. PATENT DOCUMENTS

| 7,983,693 | B2 | 7/2001 | Ruetschi | |
|---|---|---|---|---|
| 6,757,722 | B2 | 6/2004 | Lonnfors | |
| 8,386,769 | B2 | 2/2013 | Bells | |
| 2004/0073614 | A1* | 4/2004 | Blohm | H04L 67/24 709/206 |
| 2004/0153506 | A1* | 8/2004 | Ito | H04W 4/023 709/204 |
| 2008/0010301 | A1* | 1/2008 | Tian | H04L 67/24 |
| 2009/0279556 | A1* | 11/2009 | Selitser | H04L 67/101 370/401 |
| 2010/0332600 | A1* | 12/2010 | Narayan | H04L 67/14 709/206 |
| 2011/0165857 | A1* | 7/2011 | Pihlajamaki | H04L 67/24 455/405 |
| 2013/0060938 | A1* | 3/2013 | McColgan | H04L 51/043 709/224 |

(Continued)

FOREIGN PATENT DOCUMENTS

WO    2008/102265    8/2008

*Primary Examiner* — Peling Shaw
(74) *Attorney, Agent, or Firm* — IP Spring

(57) ABSTRACT

Implementations generally relate to configuring presence and notifications in persistent conversations. In one implementation, a method includes receiving a presence state associated with a user and causing the presence state to be selectively displayed to one or more target users. The method also includes determining that an event has occurred for which a notification is to be sent to the user, and selectively delivering the notification to the user based on the configured presence state.

20 Claims, 5 Drawing Sheets

(56) References Cited

U.S. PATENT DOCUMENTS

2013/0205228 A1* 8/2013 Fullea Carrera ........ H04L 67/24
 715/753
2014/0149511 A1* 5/2014 Nunez Diaz ............ H04L 67/24
 709/204

* cited by examiner

CONFIGURING PRESENCE AND NOTIFICATIONS IN PERSISTENT CONVERSATIONS

RELATED APPLICATIONS

This application is a continuation of, and claims priority to, U.S. patent application Ser. No. 13/894,408, filed May 14, 2013, the contents of which are incorporated herein by reference in their entirety.

BACKGROUND

Conversation systems and services typically enable users to interact with one another and share information. Chat applications or channels provide digital mediums for users to distribute content such as text, images, videos, audio files, hyperlinks to websites, etc. to other users. Users may indicate their availability status to other users in a chat channel.

SUMMARY

Implementations generally relate to configuring presence and notifications in persistent conversations. In one implementation, a method includes receiving a presence state associated with a user and causing the presence state to be selectively displayed to one or more target users. The method also includes determining that an event has occurred for which a notification is to be sent to the user, and includes selectively delivering the notification to the user based on the configured presence state. The method also includes configuring a reachable presence state to be associated with a first set of one or more target users, and configuring an unreachable presence state to be associated with a second set of one or more target users. The method also includes updating a user interface to indicate the configured presence state.

With further regard to the method, in some implementations the user is visible to a first set of target users when the presence state is configured to reachable. In some implementations notifications will be delivered to the user when the presence state is configured to reachable. In some implementations the user is not visible to a second set of target users when the presence state is configured to unreachable. In some implementations notifications will not be delivered to the user when the presence state is configured to unreachable.

In some implementations the method includes configuring the presence state to reachable, and the reachable presence state includes multiple availability levels. With further regard to the method, in some implementations, the method includes configuring the presence state to hyper-available. With further regard to the method, in some implementations the method includes configuring the presence state to be associated with one or more social network groups.

In some implementations, a method includes receiving a presence state associated with a user, and causing the presence state to be selectively displayed to one or more target users. The method also includes determining that an event has occurred for which a notification is to be sent to the user, and selectively delivering the notification to the user based on the configured presence state. The method also includes configuring a reachable presence state to be associated with a first set of one or more target users, and configuring an unreachable presence state to be associated with a second set of one or more target users. The method also includes updating a user interface to indicate the configured presence state.

In some implementations a system includes one or more processors; and logic encoded in one or more tangible media for execution by the one or more processors. When executed the logic is operable to perform operations including receiving a presence state associated with a user and causing the presence state to be selectively displayed to one or more target users. The logic when executed is further operable to perform determining that an event has occurred for which a notification is to be sent to the user, and selectively delivering the notification to the user based on the configured presence state.

The logic when executed is further operable to perform operations including configuring a reachable presence state to be associated with a first set of one or more target users, and configuring an unreachable presence state to be associated with a second set of one or more target users. The logic when executed is further operable to perform operations including updating a user interface to indicate the presence state.

With regard to the system, in some implementations the user is visible to a first set of target users when the presence state is configured to reachable. In some implementations notifications will be delivered to the user when the presence state is configured to reachable. In some implementations, the user is not visible to a second set of target users when the presence state is configured to unreachable. In some implementations, notifications will not be delivered to the user when the presence state is configured to unreachable.

The logic when executed is further operable to perform operations including configuring the presence state to reachable, and where the reachable presence state includes multiple availability levels. The logic when executed is further operable to perform operations including configuring the presence state to hyper-available.

DETAILED DESCRIPTION

Embodiments described herein provide a system for facilitating users of a conversation system in configuring presence and notifications for target users. In various implementations, a system receives a presence state associated with a user. System then causes presence state to be selectively displayed to target users. System then determines that an event has occurred for which a notification is to be sent to user, and selectively delivers notification to user based on the configured presence state.

In some implementations, system configures a reachable presence state to be associated with a first set of target users, and configures an unreachable presence state to be associated with a second set of target users. In some implementations, system updates a user interface or interfaces to indicate presence state (e.g., a visual indication that user is unreachable).

In various implementations, when presence state is configured to reachable, user is visible to first set of target users, and notifications will be delivered to user. In various implementations, when presence state is configured to unreachable, user is not visible to second set of target users, and notifications will not be delivered to user. In some implementations, reachable presence state includes multiple availability levels (e.g., reachable or hyper-available). In some implementations, system configures presence state to be associated with social network groups.

For ease of illustration, some embodiments are described in the context of a communication channel such as a persistent conversation communication channel. While some implementations are discussed herein in relation to certain example message types such as native persistent conversation client messages, text messaging (e.g., short message service), email, chat, social network messages, multi-way audio/video conferences and phone calls, it will be appreciated that implementations may be applied to other present or future developed message or communication types.

Figure 1:
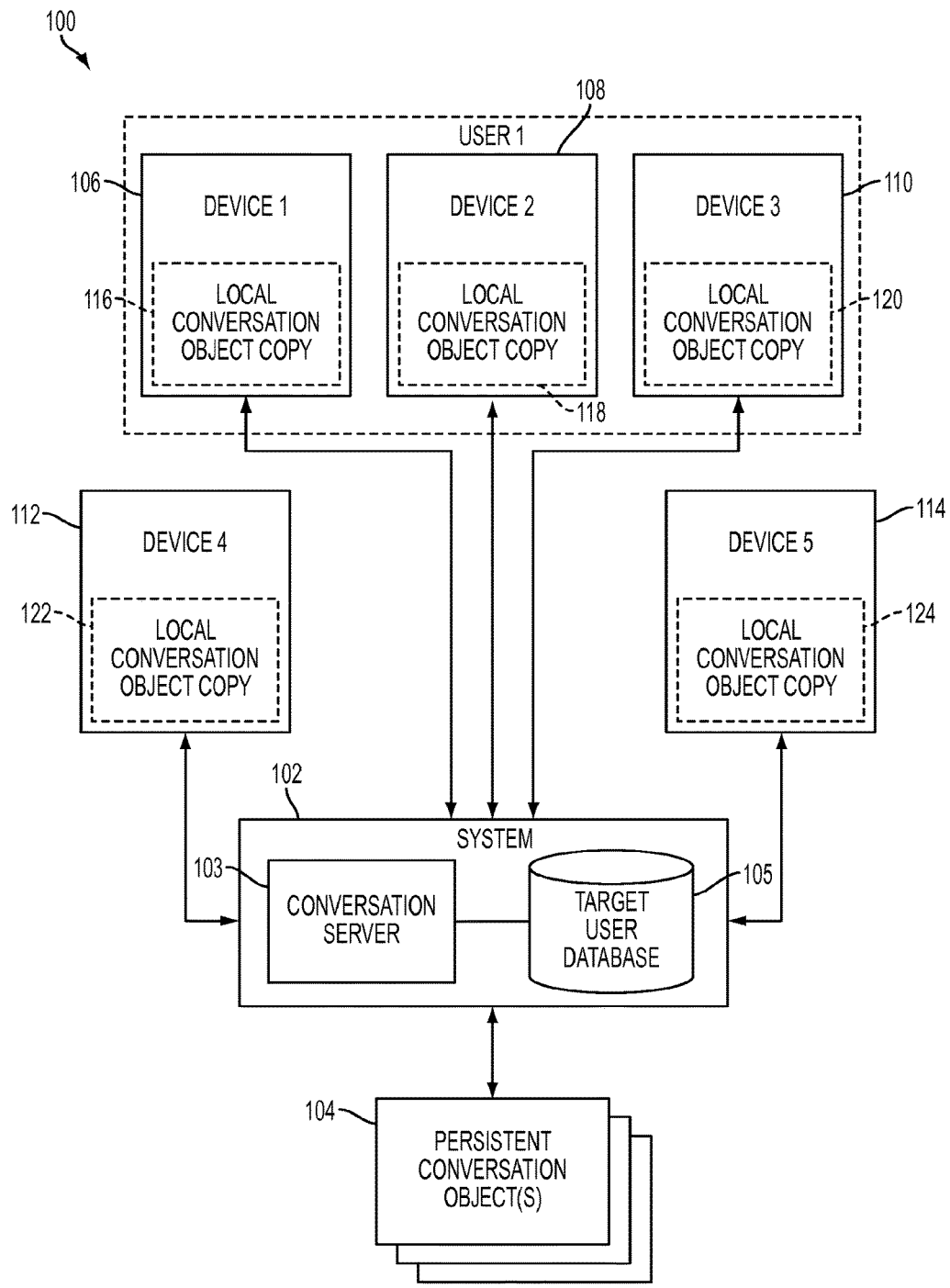
FIG. 1 illustrates a block diagram of an example environment for engaging in persistent conversations on various devices, which may be used to implement the implementations described herein.

As shown in FIG. 1, an environment 100 for configuring presence and notifications may include a system 102 that includes a conversation server 103 and a target user database 105. The environment 100 may also include one or more persistent conversation objects 104. A plurality of devices 106-114 may be in communication with the conversation server 103. Each device 106-114 may have a local copy (local conversation object copies 116-124, respectively) of at least a portion of a persistent conversation object 104. Multiple devices may be associated with a single user. For example, devices 1, 2 and 3 (106-110) are associated with user 1.

In operation, the conversation server 103 receives communication messages from one or more of the devices 106-114 and adds the communication message to a corresponding persistent conversation object 104. The conversation server 103 may first create the persistent conversation object 104, if one does not exist yet for the conversation. The conversation server 103 updates conversation state information for the persistent conversation object(s) 104 and then sends the communication message and updates, notifications of the newly received communication message and/or the updated conversation state information to the other devices associated with users participating in the corresponding conversation.

Each device may be executing a persistent conversation client that is kept in synchronization with the persistent conversation object(s) 104 stored and maintained by the conversation server 103. The central copy of the persistent conversation object 104 may be a canonical copy of the conversation and/or contain the canonical state of the conversation. A local copy (e.g., any of local conversation object copies 116-124) of at least a portion of a persistent conversation object 104 may be cached at each device (e.g., any of devices 106-114) executing a conversation client associated with a target user in the conversation.

A conversation is initiated when a user starts a conversation with one or more other users or target users. A persistent conversation may be given a name, and participants may view members in the conversation and add members to the conversation. A conversation may be fully democratic (e.g., have no owner or moderator). Alternatively, a conversation may be moderated.

Conversations may be one-to-one or group conversations (e.g., at least three participants in a one-to-many or many-to-many arrangement). In any group conversation (e.g., three or more participants), a user may leave the conversation. Any user in any group conversation may add other users to the conversation. In some implementations, a conversation that originates as a one-on-one conversation cannot be converted to a group conversation. In a group conversation, users participating in the conversation may invite other users into the conversation by adding them to the conversation participants (e.g., by adding the new user(s) to the distribution list of users receiving a message in the conversation).

A user participating in a one-on-one conversation may not leave the conversation, but may delete the conversation (or one or more messages within the conversation). A user may delete individual messages from a conversation or the entire conversation. When a conversation (or message) is deleted, it may be removed from the user's device(s), but may remain in the persistent conversation object 104.

A persistent conversation object 104 may include conversation content and state information. The conversation state information may include a current focus state for each of the conversation participants. For example, the focus state may be one of focused, unfocused, and typing. A focused state may be determined on a mobile device, for example, as the conversation client application being open and having visibility on the device display. On a desktop or laptop computer, the focused state may be determined from the keyboard and/or mouse focus. In general, any indication that a conversation client application is visible or in use may be used to determine the focused state. The unfocused state may be determined as the opposite of the focused state (e.g., the conversation client application is not open (for mobile devices) or does not have keyboard or mouse focus (for desktop and laptop computers). The typing state may be determined based on the focused state coupled with an indication that the user is entering text (or otherwise entering data for the conversation such as audio, video or the like).

In some implementations, the focused state may be determined by one or more of calendar data, event data, or check-in data. In other implementations, the focused state may be determined by activity data and payment data.

Notification state may include information about whether a user has responded to (or cleared or ignored) a notification on a device and whether the user has enabled a "do not disturb" feature. The focus state and the notification state are applicable to both one-on-one and group conversations.

Figure 2:
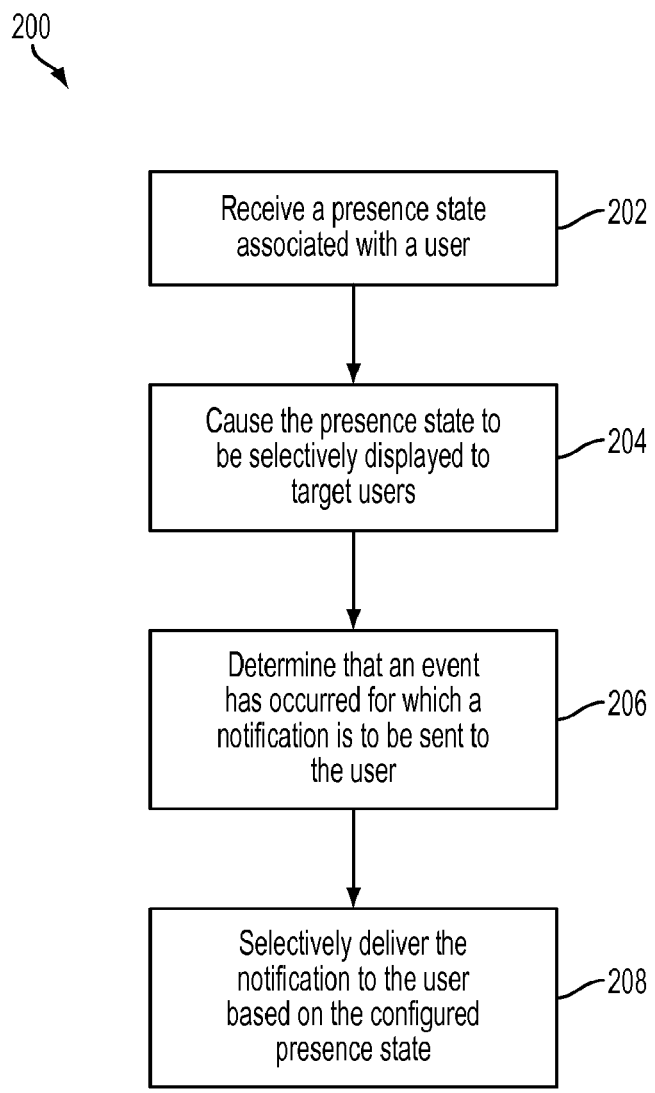
FIG. 2 illustrates an example simplified flow diagram for configuring presence state and notifications, according to one implementation.

FIG. 2 illustrates an example simplified flow diagram for configuring presence and notifications in persistent conversations, according to some implementations. Referring to FIGS. 1 and 2, a method is initiated in block 202, where system 102 receives a presence state associated with a user. In various implementations, system 102 may provide a user interface element to configure presence and notifications in persistent conversations using any suitable graphical user interfaces (GUIs). Various example implementations directed to example environments and user interface elements for configuring presence and notifications in persistent conversations are described in more detail below.

Figure 3:
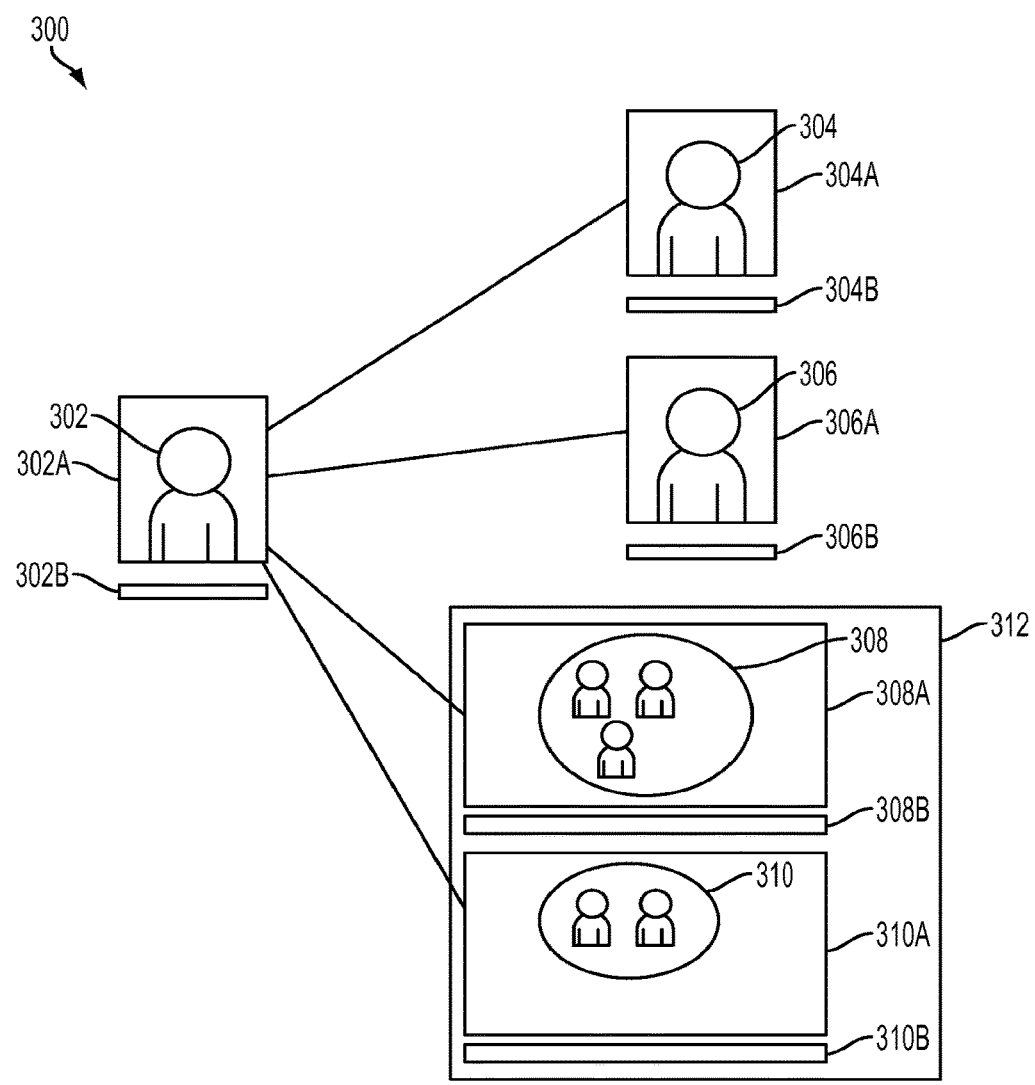
FIG. 3 illustrates an example environment for configuring presence state and notifications in persistent conversations, according to some implementations.

FIG. 3 illustrates an example environment 300 for configuring presence and notifications in persistent conversations, according to some implementations. As shown in this example implementation, environment 300 includes a user 302 who may communicate with respective target users 304, 306, 308, and 310. For ease of illustration four target users 304, 306, 308, and 310 are shown in this particular example. In various implementations, there may be various numbers of users participating in a persistent conversation.

FIG. 3 also shows an avatar 302A associated with user 302. In various implementations, avatar 302A may indicate different received presence states associated with user 302. In various implementations received presence states may be determined by system 102 based on user 302's activities without user's 302 input. For example, presence state may be determined by focus state described above. In some implementations, user 302 may set or configure presence state.

In various implementations, one of the received presence states may include an unreachable presence state. System 102 may determine an unreachable presence state when focus state is unfocused as described above. For example, system 102 may determine an unreachable presence state when user 302 is utilizing his or her mobile phone but has not turned on a persistent conversation client. As described in more detail below in connection with FIG. 4, user 302 may configure an unreachable presence state when user 302 does not wish to be disturbed by target users 304, 306, 308, and 310. User 302 in effect wishes to selectively mute one or more target users 304, 306, 308, and 310.

In various implementations, one of the received presence states may include a reachable presence state, that may have multiple availability levels. Multiple availability levels may be based on the focus state of the user 302, as defined above. In an example implementation, system 102 may determine a reachable presence state when user 302 is in a focused state, for example device of the user 302 is turned on and a persistent conversation client is available on the device. In some implementations, system 102 may configure a reachable presence state when user 302 employs keyboard or mouse to make a selection on a user interface. In some implementations, as described in more detail below in connection with FIG. 4, user 302 may configure a reachable presence state, reachable presence state will then be visible to target users 304, 306, 308, and 310 and clearly indicate that user is available.

In various implementations, reachable presence state may include a hyper-available level. In an example implementation, system 102 may determine a hyper-available level when user 302, is in a typing state. The typing state may be determined based on focused state coupled with an indication that user 302 is entering text (or otherwise entering data for the conversation such as audio, video or the like). In some implementations, as described in more detail below, in connection with FIG. 4, user 302 may configure a hyper-available presence state to target users 304, 306, 308, and 310.

In various implementations, system 102 may selectively configure a different presence state for each target user 304, 306, 308, and 310. In a non-limiting example scenario, user 302 may have just returned from a trip with target users 304 and 306. User 302 has decided to spend the morning engaging in a persistent conversation with target users 304 and 306.

System 102 without user input creates a photo album automatically generated by system 102 from images exchanged in persistent conversation among user 302 and target users 304 and 306. In this example implementation, system 102 selectively configures the presence state of user 302 to hyper-available with respect to target users 304 and 306 based in part on the interaction of exchanging images and viewing photo album. In some implementations, as described in more detail below, in connection with FIG. 4, user 302 may configure a hyper-available level of reachable presence state.

In this example scenario, user may configure a presence state of unreachable for target user 308, because while engaging with viewing the photo album with target users 304 and 306, user does not wish to be disturbed by notifications from target user 308. In this same example scenario, although user may not be engaging in a persistent conversation with target user 310, presence state of user 302 may be seen as reachable by target user 310. This visibility of a reachable presence state, may be based in part on user's 302 focus state of engaging in persistent conversation activity and the fact that user 302 has not muted target user 310.

Referring to FIGS. 2 and 3, in block 204, in various implementations, system 102 may cause presence state to be selectively displayed to target users 304, 306, 308, and 310. In various implementations avatar 302A may be an image, such as an image of the face of user 302, a scene, an animation, an object, a landmark, a symbol, etc. In some implementations, when presence state is set to unreachable, system 102 may gray out avatar 302A. In other implementations, system 102 may obscure avatar 302A or employ other visual indicators or symbols to indicate that user 302 is unreachable.

Referring to FIGS. 2 and 3, in various implementations when presence state is set to reachable, system 102 may enhance the appearance of an image in avatar 302A. For example system 102 may make image brighter, or present image with normal color and contrast (e.g., not grayed out). In other implementations system 102 may cause a presence indicator (e.g., presence indicator 302B) to be displayed prominently in association with avatar 302A. FIG. 3 illustrates an example showing a rectangular shaped presence indicator 302B displayed below avatar 302A. System 102 may vary size, shape, color, or animation of presence indicator 302B to indicate a corresponding presence state. In a non-limiting example implementation, system 102 may display a colored rectangle (e.g. a green rectangle) as presence indicator 302B when presence state is configured to hyper-available. In other example implementations, system 102 may not display presence indicator 302B when presence state is configured to reachable.

In various implementations, visibility of user's 302 avatar 302A in a persistent conversation system will depend on configured presence state. Referring to FIG. 3, in an example implementation system 102 may configure user's 302 presence state for target user 304 to reachable, and configure user's 302 presence state for target user 308 to unreachable. In this example implementation, target user 304 will clearly see a version of user's avatar 302A indicating that user is 302 is reachable, whereas target user 308 will see a version of user's avatar 302A indicating that user is unreachable. For example, user's avatar 302A may appear enhanced or brighter to target user 304 whereas user's avatar 302A will be grayed out to target user 308. In various implementations, configuration of user 302's presence state with respect to target users 304, 306, 308, and 310 is asymmetric, meaning user's 302 configuration of his or her own presence state will not impact user's 302 visibility of presence states of target users 304, 306, 308, and 310.

In another example implementation, user 302 starts typing a chat message while in a persistent conversation and sharing photos in the persistent conversation with target user 306 and target user 310. In this example implementation, target user 306 and target user 310 see user's 302 avatar 302A with a presence indicator 302B in the form of a green colored line displayed under avatar 302A. In this example implementation, this presence indicator 302B corresponds to a presence state of hyper-available.

Referring to FIG. 2, in block 206, in various implementations, system 102 determines that an event has occurred for which a notification is to be sent to user 302. Example notifications include attempted chat messages, audio conversations, video conversations, a shared image, a shared video, etc.

Referring to FIG. 2, in block 208, in various implementations, system 102 selectively delivers the notification to user 302 based on configured presence state. Referring to FIG. 3, in an example implementation, presence state for target users 304, 306, and 308 is configured to reachable and presence state for target user 310 is configured to unreachable. In this example implementation, target users 304, 306, and 308 invite user 302 to join a video call. System 102 then causes a notification in the form of an invitation to be sent to user 302, and the notification is received by user 302. In the same example implementation, target user 310 invites user 302 to join a video call, however system 102 will not deliver the notification to join the video call to user 302, because presence state of unreachable is configured for target user 310. User 302 has effectively muted target user 310.

Figure 4:
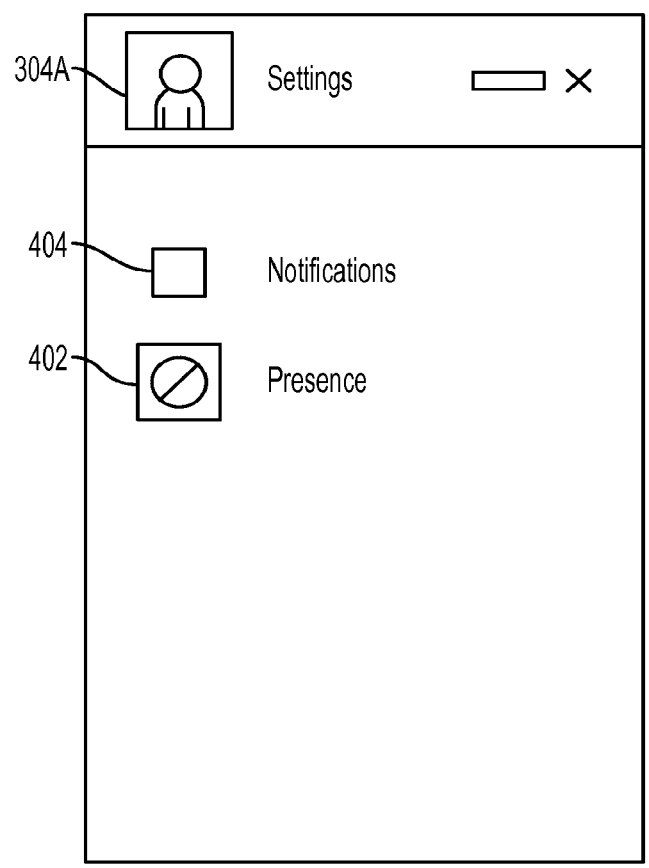
FIG. 4 illustrates an example simplified diagram of a user interface, according to one implementation.

FIG. 4 illustrates an example simplified user interface 400, according to some implementations. Referring to FIGS. 3 and 4, in some implementations, system 102 enables user 302 to select (e.g., tap on) one of the avatars 304A, 306A, 308A, and 310A, in which case system 102 causes user interface 400 to apply settings for the respective avatar (e.g. 304A) to be displayed and viewable to user 302. In various implementations, system 102 may permit user 302 to employ user interface 400 to apply presence and notifications settings to the target user 304 associated with avatar 304A.

In an example implementation, if user 302 wishes to configure his or her presence state as unreachable for target user 304, system 102 enables user 302 to apply this configuration by selecting (e.g., tapping on) a presence button 402. In other implementations, if user 302 would like no notifications from target user 304 be delivered to user 302 (e.g. mute target user 304), then system 102 enables user 302 to configure this by selecting (e.g., tapping on) a notifications button 404.

In some implementations, when user 302 wishes to change the settings applied to target user 304, user 302 may unselect (e.g., tap again) on presence button 402 and the notifications button 404. Accordingly, user 302 will now appear visible to target user 304 and user 302 will receive notifications from target user 304.

As indicated above, in various implementations system 102 may configure presence and notifications settings for target users 304, 306, 308, and 310 without user 302 input, based on focus state. In some implementations, with the consent of the user 302, presence and notification settings may be applied to target users 304, 306, 308, and 310, whether or not user 302 employs user interface 300 to configure these settings.

In some implementations, target users may be an entire social network group and may include one or more target users of particular categories. As illustrated in FIG. 3 target users 308 and 310 represent social network groups made up of one or more target users. Example social network groups may include the categories of friends, family, and work. Other examples of social network groups include sports, acquaintances, following, co-workers, friends-of friends, customers, teammates, clients, relatives, club members, classmates, people associated with a particular hobby, vocation, profession, or any other selected grouping. In an implementation, system 102 may provide a category for all social network groups. The particular category of people may vary depending on the particular implementation. Furthermore, the particular categories of people may include other types of people in addition to these categories listed herein. A social network group may be selected from a predetermined set of groups or system 102 may enable the creation of any group definition or characterization, for example by providing using an unconstrained text field.

In some embodiments, to create a social network group, user 302 of system 102 may find contacts by performing a search, and then add one or more contacts to a particular social network group. Note that a particular social network group, for example the friends social network group, may include a single contact or a group of contacts. Furthermore, the act of user 302 adding a particular contact to a given social network group creates a social connection between user 302 and the contact. In some implementations, user 302 may add contacts to one or more of the social network groups without requiring any actions (e.g., acceptance, acknowledgement, etc.) from contacts.

In some implementations, user 302 may invite another contact to connect socially (e.g., to be added to one or more of the social network groups, to be a connection, to be friends, etc.). The recipient of the invitation may respond by accepting the invitation, which creates a social connection. Once the social connection is made, user 302 and the respective contact may engage via various social activities. For example, they may visit each other's indicator pages, follow each other's posts, send messages to each other, etc.

In some implementations the contacts are not aware of the one or more social network groups they are in. This may be known only to user 302. In some implementations, the social network groups created by user 302 may be known to user 302 and to target users who are members of social network groups (e.g., the target users receive an indication that they have been added to particular social network groups).

In some implementations, system 102 enables user 302 to create a social network group that is a combination of two or more groups of social network groups, which may also be referred to as a supergroup. In an example implementation, referring to FIG. 3, in the illustrated example a supergroup 312 is formed from target user 308 social network group and target user 310 social network group.

Although the steps, operations, or computations described herein may be presented in a specific order, the order may be changed in particular implementations. Other orderings of the steps are possible, depending on the particular implementation. In some particular implementations, multiple steps shown as sequential in this specification may be performed at the same time.

While system 102 is described as performing the steps as described in the implementations herein, any suitable component or combination of components of system 102 or any suitable processor or processors associated with system 102 may perform the steps described.

Embodiments described herein provide various benefits. For example, embodiments facilitate users in configuring presence state and notification delivery for target users 304, 306, 308, and 310. Embodiments described herein also facilitate selectively displaying presence to target users 304, 306, 308, and 310. Some embodiments facilitate a user's ability to mute communications and notifications from particular target users, and still receive communications and notifications from other target users.

Figure 5:
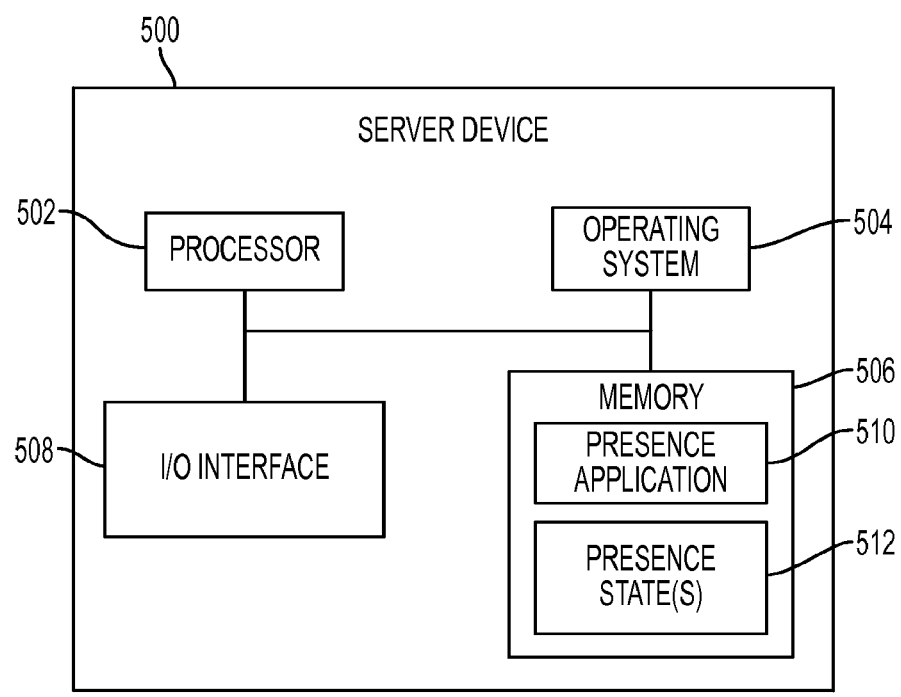
FIG. 5 illustrates a block diagram of an example server device, which may be used to implement the implementations described herein.

FIG. 5 is a diagram of an example server device 500 that may be used to create, manage, and synchronize notifications on different devices in accordance with some implementations. The server device 500 includes a processor 502, operating system 504, memory 506 and input/output (I/O) interface 508. The memory 506 may include a presence application 510 and one or more presence state information objects 512.

In operation, the processor 502 may execute the presence application 510 stored in the memory 506. The presence application 510 may include software instructions that, when executed by the processor, cause the processor to perform operations for creating, managing, and synchronizing notifications on different devices [e.g., the presence application 510 may perform one or more of steps 202-208 described above and, in conjunction, may access presence state information object(s) 512]. The presence application 510 may also operate in conjunction with the operating system 504.

Notifications may be used among members (or users) of a social network. For example, notifications corresponding to the messages sent between a first social network member and one or more other members in the social graph of the first social network member (or to users outside of the social network) may be synchronized.

The server (e.g., conversation server 103 and/or server device 500 may include, but is not limited to, a single processor system, a multi-processor system (co-located or distributed), a cloud computing system, or a combination of the above.

The client (or user, member or conversation target user) device may include, but is not limited to, a desktop computer, a laptop computer, a portable computer, wearable computer, a tablet computing device, a smartphone, a feature phone, a personal digital assistant, a media player, an electronic book reader, an entertainment (or computing) system of a vehicle or the like. Other examples of devices include computing and/or display systems built into windows, walls, furniture, glasses, goggles, wrist watches, clothing or the like. In general, any computing device capable of implementing one or more of the methods described herein may be used.

The user devices may be connected to a conversation server via a network. The network connecting user devices to a conversation server may be a wired or wireless network, and may include, but is not limited to, a WiFi network, a local area network, a wide area network, the Internet, or a combination of the above.

The data storage, memory and/or computer readable medium may be a magnetic storage device (hard disk drive or the like), optical storage device (CD, DVD or the like), electronic storage device (RAM, ROM, flash, or the like). The software instructions may also be contained in, and provided as, an electronic signal, for example in the form of software as a service (SaaS) delivered from a server (e.g., a distributed system and/or a cloud computing system).

Moreover, some implementations of the disclosed method, system, and computer readable media may be implemented in software (e.g., as a computer program product and/or computer readable media having stored instructions for configuring presence and notifications as described herein). The stored software instructions may be executed on a programmed general purpose computer, a special purpose computer, a microprocessor, or the like.

In various implementations, assistant services may be accessed on a device to assist the needs of a user. In some implementations, assistant services may be provided from one or more systems accessed remotely over one or more networks, such as the Internet or World Wide Web. For example, the services may be provided by one or more server systems connected to a network. Some implementations may implement assistant services locally to a device. Expert systems may be used in some implementations to provide desired information in specific subjects.

In some implementations, assistant services may include the use of intelligent assistants or "agents." These agents may be software that is accessible to a user using a device and that may access local functions and features of the device, as well as remote assistant services to gather information and/or perform actions to assist a user of the device. The agent may perform any of a variety of assistive functions.

Some implementations may provide an agent having a simple and natural interface to allow users to easily interact with the agent. In some examples, agents may perform user-friendly natural language processing of user input, for example user 302 may use spoken input to configure presence state selectively for target users 304, 306, 308, and 310. For example, an agent may use voice recognition systems to interpret spoken input from user 302 and then display the configured presence state to target users 304, 306, 308, and 310.

In situations where system 102 collects and/or uses personal information about users, or may make use of personal information, the users may be provided with an opportunity to control whether programs or features collect user information (e.g., information about a user's social network, social actions or activities, profession, a user's preferences, or a user's current location), or to control whether and/or how to receive content from the conversation server 103 that may be more relevant to the user. In addition, certain data may be treated in one or more ways before it is stored or used, so that personally identifiable information is removed. For example, a user's identity may be treated so that no personally identifiable information may be determined for the user, or a user's geographic location may be generalized where location information is obtained (such as to a city, ZIP code, or state level), so that a particular location cannot be determined. Thus, the user may have control over how information is collected by system 102 and used by a content server.

What is claimed is:

1. A method comprising:
   determining a focus state for a user, wherein the user is a participant in at least one conversation with one or more target users;
   automatically configuring a presence state for the user based at least in part on the determined focus state;
   determining that a conversation event has occurred for which a notification is to be sent to the user, wherein a particular user of the one or more target users is associated with the conversation event; and
   selectively delivering the notification to the user based on the presence state for the user.

2. The method of claim 1, wherein the conversation event is at least one of: an attempted chat message, an invitation to join an audio conversation, an invitation to join a video call, an image shared with the user, and a video shared with the user.

3. The method of claim 1, wherein automatically configuring the presence state is further based on a notification state for the user.

4. The method of claim 3, wherein the notification state includes information about whether the user has responded to a notification, cleared a notification, or ignored a notification.

5. The method of claim 3, wherein the notification state includes information about whether the user has enabled a do not disturb feature.

6. The method of claim 1, wherein determining the focus state is based on one or more of: a conversation client application being open and having visibility on a display of a device of the user, an input device of the device of the user having focus, and whether there is an indication that the user is entering data for the at least one conversation.

7. The method of claim 6, wherein if the conversation client application is open and has visibility on the display of the device of the user, the focus state is determined as a focused state, and if the conversation client application is not open, the focus state is determined as an unfocused state.

8. The method of claim 6, wherein if there is the indication that the user is entering data for the at least one conversation, the focus state is determined as a typing state.

9. The method of claim 1, wherein determining the focus state is based on one or more of: calendar data, event data, check-in data, and payment data.

10. The method of claim 1, further comprising:
determining that the user is in an interaction of viewing a photo album of images exchanged in the at least one conversation; and
wherein automatically configuring the presence state comprises configuring the presence state as reachable for the one or more target users, based on determination that the user is in the interaction of viewing a photo album of images exchanged in the at least one conversation.

11. The method of claim 10, wherein automatically configuring the presence state further comprises configuring the presence state as unreachable for a different user that is not included in the one or more target users.

12. A system comprising:
one or more processors; and
logic encoded in one or more tangible media for execution by the one or more processors and when executed operable to perform operations comprising:
determining a focus state for a user, wherein the user is a participant in at least one conversation with one or more target users;
automatically configuring a presence state for the user based at least in part on the determined focus state;
determining that a conversation event has occurred for which a notification is to be sent to the user, wherein a particular user of the one or more target users is associated with the conversation event; and
selectively delivering the notification to the user based on the presence state for the user.

13. The system of claim 12, wherein the conversation event is at least one of: an attempted chat message, an invitation to join an audio conversation, an invitation to join a video call, an image shared with the user, and a video shared with the user.

14. The system of claim 12, wherein determining the focus state is based on one or more of: a conversation client application being open and having visibility on a display of a device of the user, an input device of the devices of the user having focus, and whether there is an indication that the user is entering data for the at least one conversation.

15. The system of claim 14, wherein if the conversation client application is open and has visibility on the display of the device of the user, the focus state is determined as a focused state, and if the conversation client application is not open, the focus state is determined as an unfocused state.

16. A non-transitory computer readable medium with instructions stored thereon that, when executed by a processor, cause the processor to perform operations comprising:
determining a focus state for a user, wherein the user is a participant in at least one conversation with one or more target users;
automatically configuring a presence state for the user based at least in part on the determined focus state;
determining that a conversation event has occurred for which a notification is to be sent to the user, wherein a particular user of the one or more target users is associated with the conversation event; and
selectively delivering the notification to the user based on the presence state for the user.

17. The non-transitory computer readable medium of claim 16, wherein the instructions cause the processor to perform further operations comprising:
determining that the user is in an interaction of viewing a photo album of images exchanged in the at least one conversation; and
wherein automatically configuring the presence state comprises configuring the presence state as reachable for the one or more target users, based on determination that the user is in the interaction of viewing a photo album of images exchanged in the at least one conversation.

18. The non-transitory computer readable medium of claim 16, wherein determining the focus state is based on one or more of: calendar data, event data, check-in data, and payment data.

19. The non-transitory computer readable medium of claim 16, wherein determining the focus state is based on one or more of: a conversation client application being open and having visibility on a display of a device of the user, an input device of the devices of the user having focus, and whether there is an indication that the user is entering data for the at least one conversation.

20. The non-transitory computer readable medium of claim 19, wherein if there is the indication that the user is entering data for the at least one conversation, the focus state is determined as a typing state.

* * * * *